United States Patent
Muninder et al.

(10) Patent No.: US 9,769,453 B2
(45) Date of Patent: Sep. 19, 2017

(54) FLICKER REDUCTION IN 3D IMAGING

(71) Applicant: Nokia Technologies Oy, Espoo (FI)

(72) Inventors: Veldandi Muninder, San Jose, CA (US); Hoseok Chang, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 261 days.

(21) Appl. No.: 14/621,938

(22) Filed: Feb. 13, 2015

(65) Prior Publication Data
US 2016/0241834 A1 Aug. 18, 2016

(51) Int. Cl.
H04N 13/00 (2006.01)
H04N 13/02 (2006.01)
G06T 5/00 (2006.01)
G06T 5/50 (2006.01)

(52) U.S. Cl.
CPC ......... *H04N 13/0033* (2013.01); *G06T 5/002* (2013.01); *G06T 5/50* (2013.01); *H04N 13/0239* (2013.01); *G06T 2207/10021* (2013.01); *G06T 2207/10028* (2013.01); *G06T 2207/20182* (2013.01); *G06T 2207/20192* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 9,407,896 | B2* | 8/2016 | Lam | H04N 13/0011 |
| 2012/0098932 | A1 | 4/2012 | Kim et al. | 348/43 |
| 2013/0342642 | A1 | 12/2013 | Drazic et al. | 348/42 |
| 2014/0002605 | A1* | 1/2014 | Liao | G06T 5/005 |
| | | | | 348/46 |
| 2014/0210951 | A1* | 7/2014 | Cho | G06T 7/0075 |
| | | | | 348/49 |
| 2015/0170371 | A1* | 6/2015 | Muninder | G06T 7/0075 |
| | | | | 382/154 |
| 2016/0227237 | A1* | 8/2016 | Kwon | H04N 13/0022 |

OTHER PUBLICATIONS

"A Non-Local Cost Aggregation Method for Stereo Matching", Qingxiong Yang, CVPR 2012, 8 pgs.
"Temporally Consistent Depth Maps Recovery from Stereo Videos", Li Yao, et al., Informational Technology Journal 11(1), 2012, pp. 30-39.
"Temporal Filtering of Disparity Measurements", L. DiStefano, et al., DEIS, University of Bologna, Italy, 2001, 6 pgs.

(Continued)

*Primary Examiner* — Wesley Tucker
(74) *Attorney, Agent, or Firm* — Harrington & Smith (57) ABSTRACT

A method including determining an aggregate cost for pixels in a frame under construction; applying a disparity computation for the pixels in the frame under construction; and storing the frame in a memory. Determining the aggregate cost for the pixels in a frame under construction includes use of at least one previous aggregate cost for the pixels in a previous frame, where the aggregate cost is determined with use of edge-aware filtering and a minimum spanning tree (MST). The disparity computation includes use of a confidence based temporal filtering of disparities at least partially using a disparity computation for the pixels in the previous frame.

26 Claims, 8 Drawing Sheets

(56) References Cited

OTHER PUBLICATIONS

"Support Aggregation via Non-linear Diffusion with Disparity-Dependent Support—Weights for Stereo Matching", Computer Science vol. 5994, pp. 25-36, 2010.
"Temporally Consistent Stereo Matching Using Coherence Function", Dongho Min et al., Mitsubishi Electric Research Laboratories, Jul. 20, 2010, 6 pgs.
"Real-time Temporal Stereo Matching using Iterative Adaptive Support Weights", Jedrzej Kowalczuk, et al., IEEE, 2013, 6 pgs.
"Temporally Consistent Disparity and Optical Flow via Efficient Spatio-temporal Filtering", Asmaa Hosni, et al., PSIVT 2011, Part I, LNCS 7087, 2011, pp. 165-177.
"Efficient spatiotemporal matching algorithm for stereo videos", Xin Fan et al., Proc. SPIE 8913 International Symposium on Photoelectronic Detection and Imaging 2013: Optical Storage and Display Technology, Jun. 25, 2013, 2 pgs.
"Confidence Evaluation for Robust, Fast-Converging Disparity Map Refinement", Jorn Jachalsky, et al., IEEE, 2010, pp. 1399-1404.
"Full-Image Guided Filtering for Fast Stereo Matching", Qingqing, et al., IEEE, 2013, pp. 237-240.
"Restoring Image Burnout in 3D-Stereoscopic Media using Temporally Consistent Disparity Maps", David Corrigan, et al., http://www.fxguide.com/quicktakes/nuke-stereo-master-class-plus-6-1-preview/; Jun. 2011, 6 pgs.

\* cited by examiner

FLICKER REDUCTION IN 3D IMAGING

BACKGROUND

Technical Field

The example and non-limiting embodiments relate generally to imaging and, more particularly, to 3D or stereo imaging.

Brief Description of Prior Developments

Stereo or 3D imaging is known. In stereo or 3D imaging, disparity computations are used for creating stereo correspondence of images.

SUMMARY

The following summary is merely intended to be examples. The summary is not intended to limit the scope of the claims.

In accordance with one embodiment, an example method comprises determining an aggregate cost for pixels in a frame under construction comprising use of at least one previous aggregate cost for the pixels in a previous frame; and applying a disparity computation for the pixels in the frame under construction, where the disparity computation comprises use of a confidence based temporal filtering of disparities at least partially using a disparity computation for the pixels in the previous frame.

In accordance with another embodiment, an example embodiment is provided in an apparatus comprising at least one processor; and at least one non-transitory memory including computer program code, the at least one memory and the computer program code configured to, with the at least one processor, cause the apparatus to: determine an aggregate cost for pixels in a frame under construction comprising use of at least one previous aggregate cost for the pixels in a previous frame; and apply a disparity computation for the pixels in the frame under construction, where the disparity computation comprises use of a confidence based temporal filtering of disparities at least partially using a disparity computation for the pixels in the previous frame.

In accordance with another embodiment, an example embodiment is provided in an apparatus comprising a non-transitory program storage device readable by a machine, tangibly embodying a program of instructions executable by the machine for performing operations, the operations comprising: determining an aggregate cost for pixels in a frame under construction comprising use of at least one previous aggregate cost for the pixels in a previous frame; and applying a disparity computation for the pixels in the frame under construction, where the disparity computation comprises use of a confidence based temporal filtering of disparities at least partially using a disparity computation for the pixels in the previous frame.

BRIEF DESCRIPTION OF THE DRAWINGS

The foregoing embodiments and other features are explained in the following description, taken in connection with the accompanying drawings, wherein.

DETAILED DESCRIPTION OF EMBODIMENTS

Figure 1:
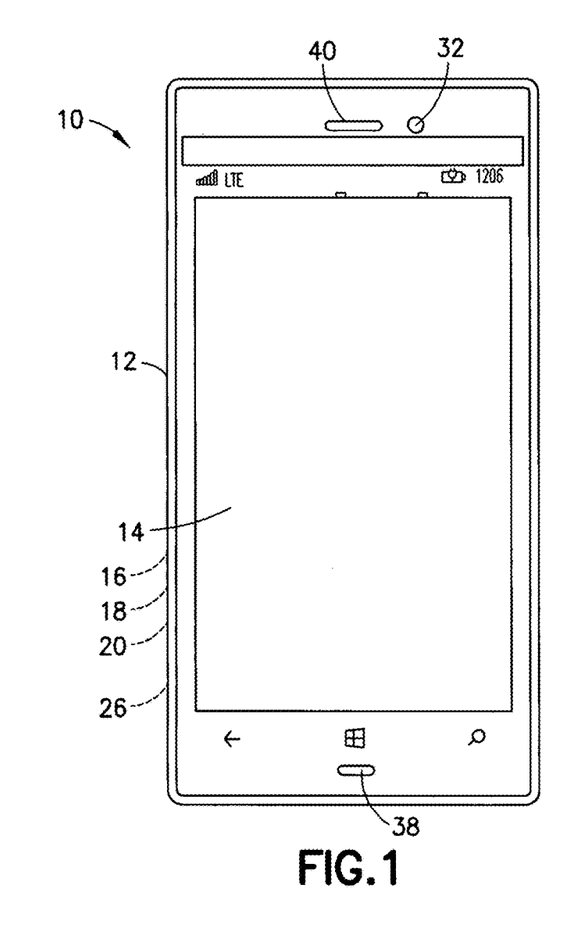
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes cameras and at least one camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Figure 2:
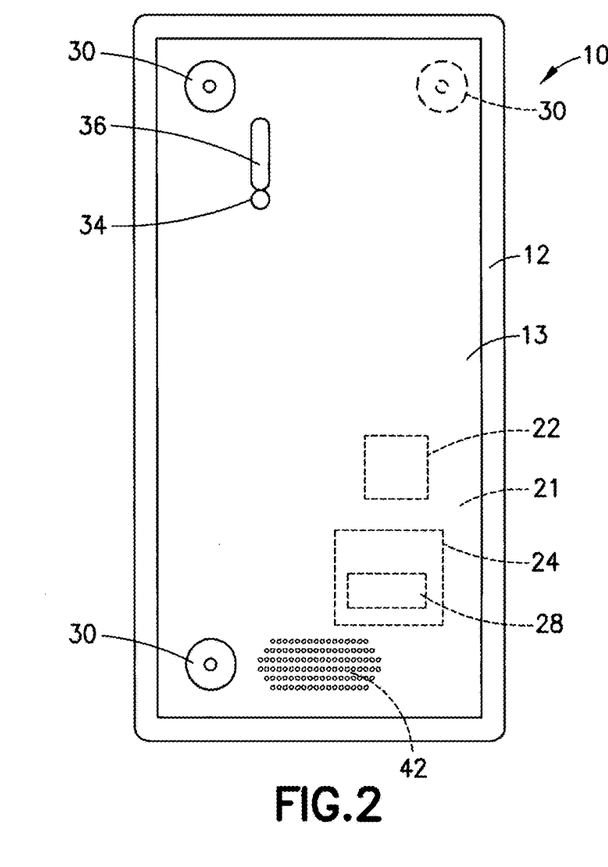
FIG. 2 is a rear view of the apparatus shown in FIG. 1.
Figure 3:
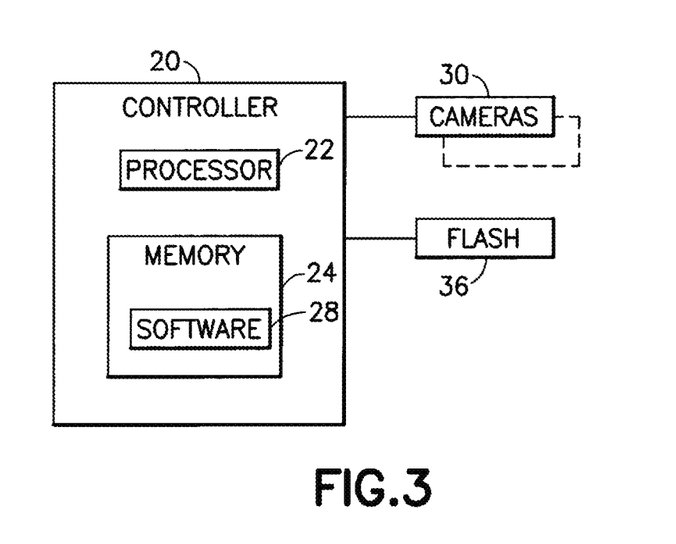
FIG. 3 is a diagram illustrating some components of the apparatus shown in FIGS. 1-2.
Figure 4A:
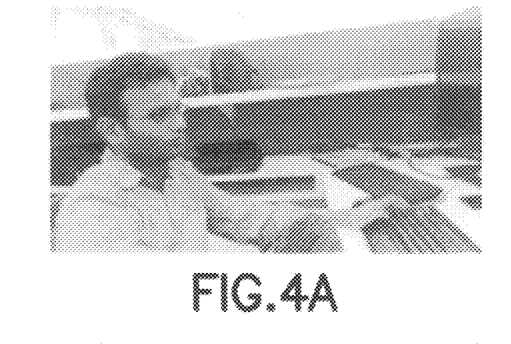
FIGS. 4A-4D are sequential reference frames of a view finder video from a right camera view, respectively
Figure 4B:
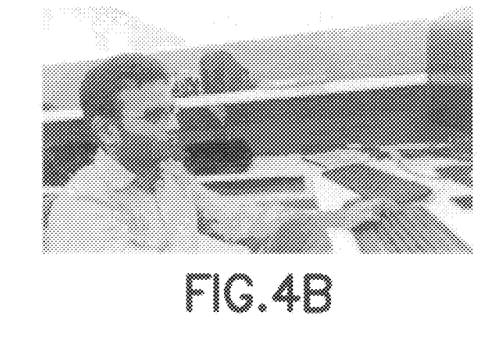
Figure 4C:
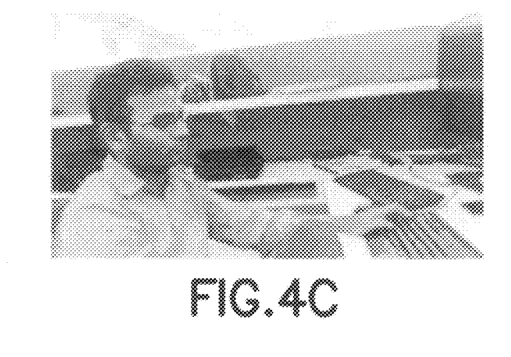
Figure 4D:
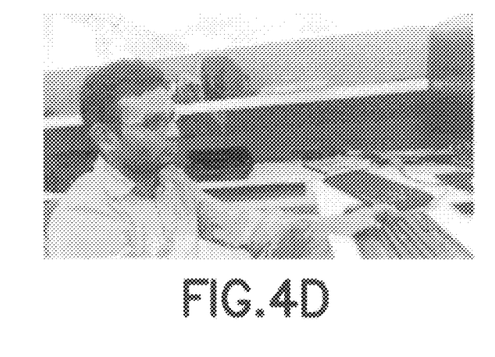
Figure 5A:
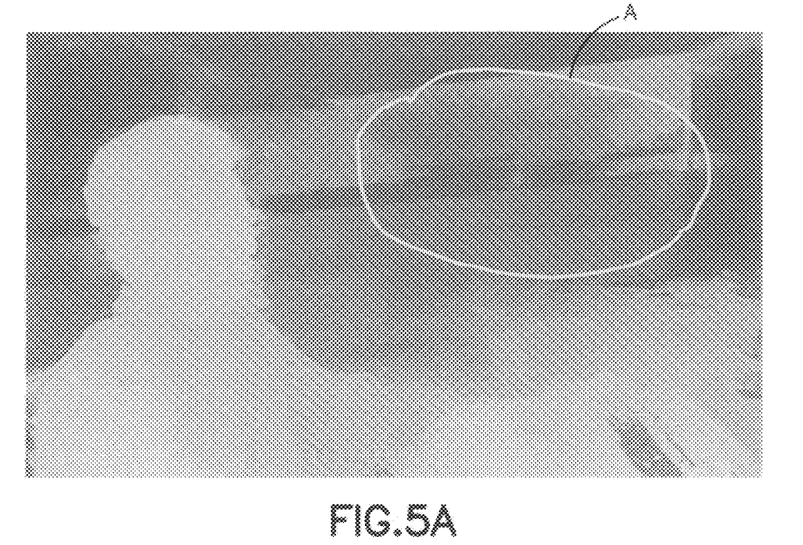
FIG. 5A-5B are an example of original disparity outputs computed from conventional stereo matching for the images shown in FIGS. 4A-4B.
Figure 5B:
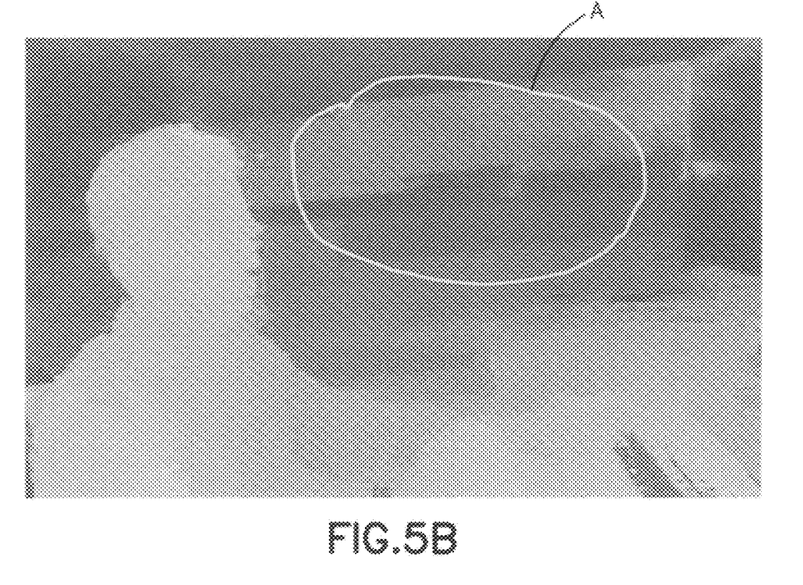
Figure 5C:
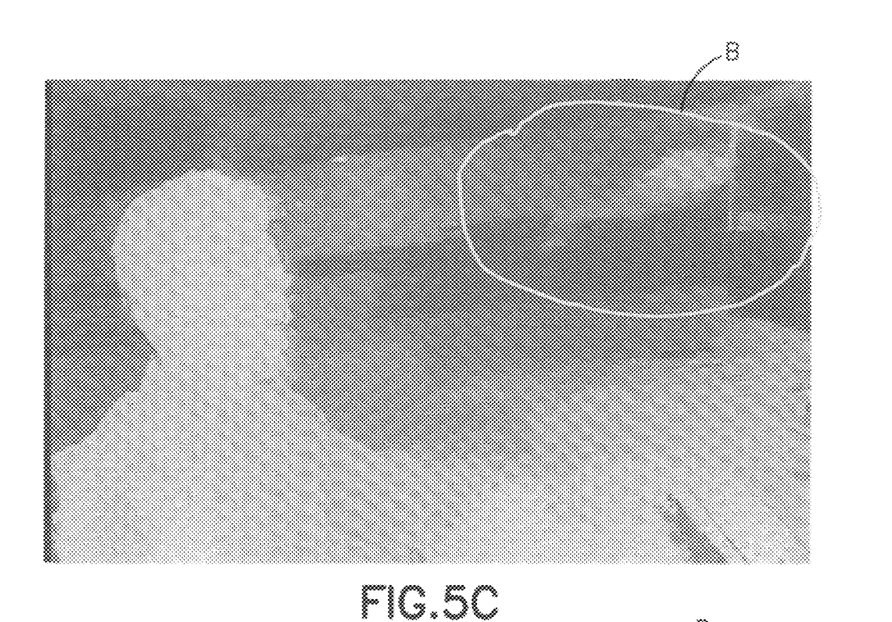
FIG. 5C-5D are an example of original disparity outputs computed from conventional stereo matching for the images shown in FIGS. 4C-4D
Figure 5D:
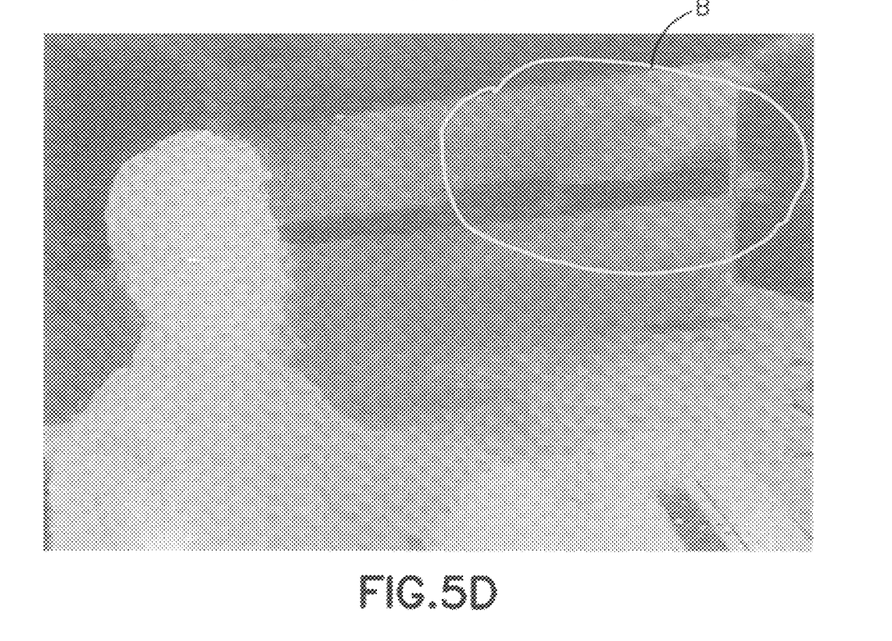
Figure 6A:
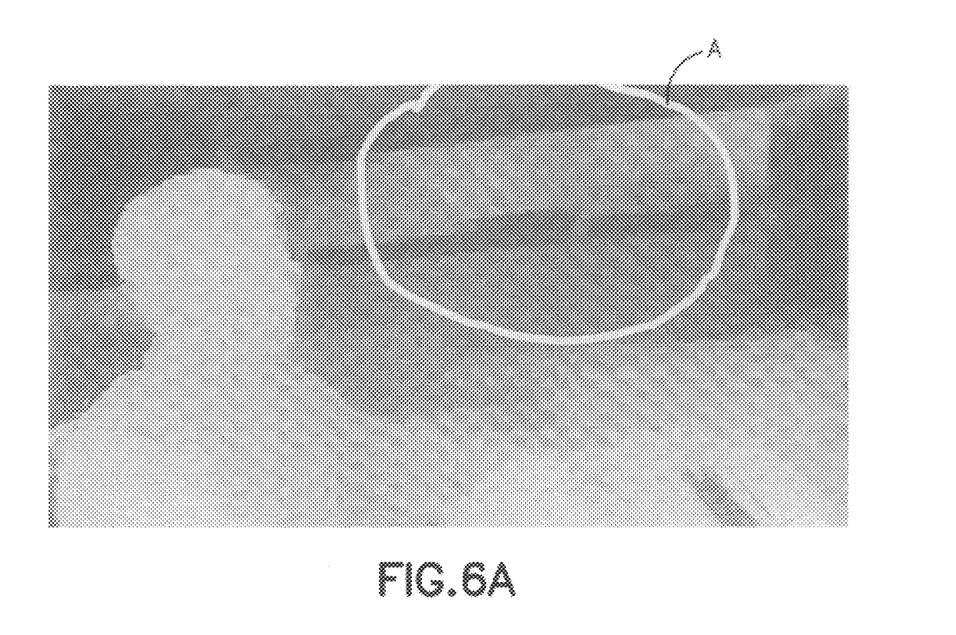
FIGS. 6A-6B are an example of disparity outputs for the images shown in FIGS. 4A-4B computed from stereo matching with the filtering solution described herein to provide the consistent disparities for the low textured regions.
Figure 6B:
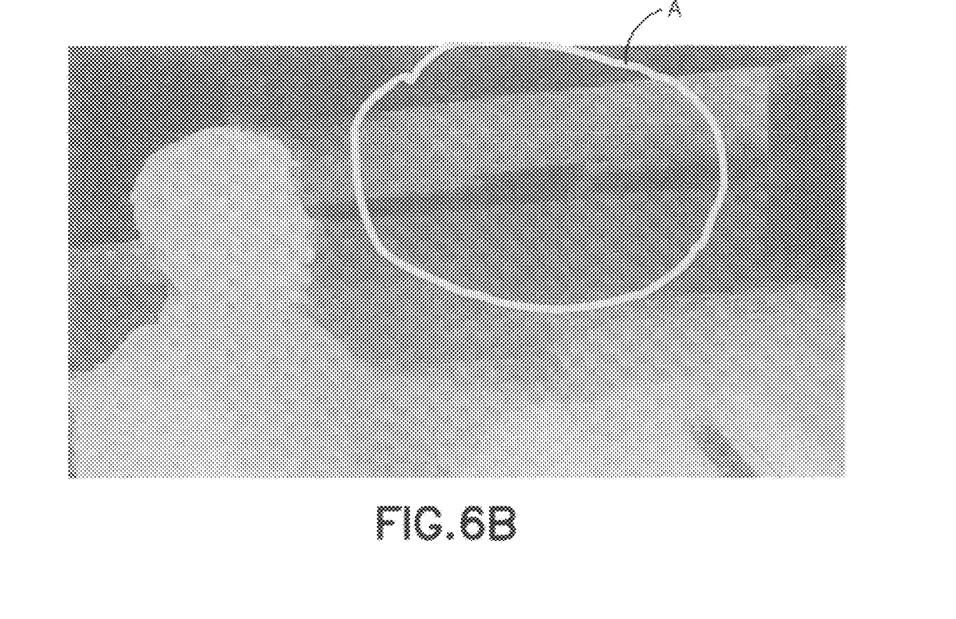
Figure 6C:
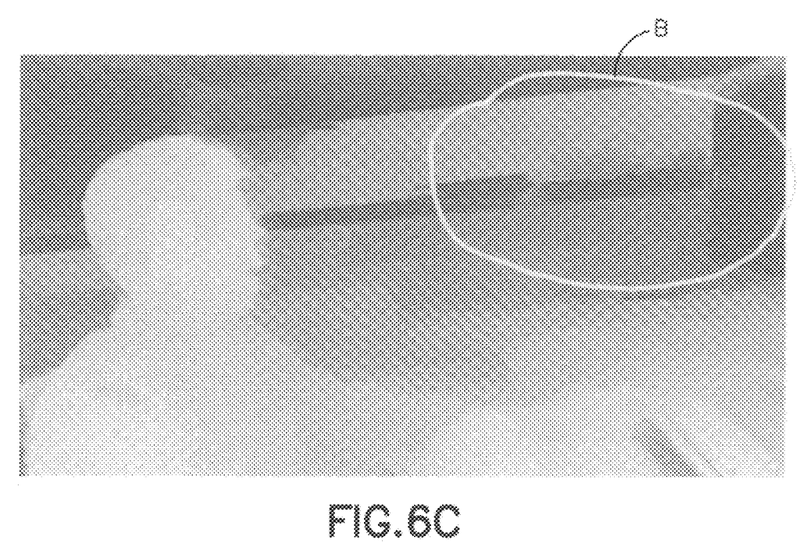
FIGS. 6C-6D are an example of disparity outputs for the images shown in FIGS. 4C-4D computed from stereo matching with the filtering solution described herein to provide the consistent disparities for the low textured regions.
Figure 6D:
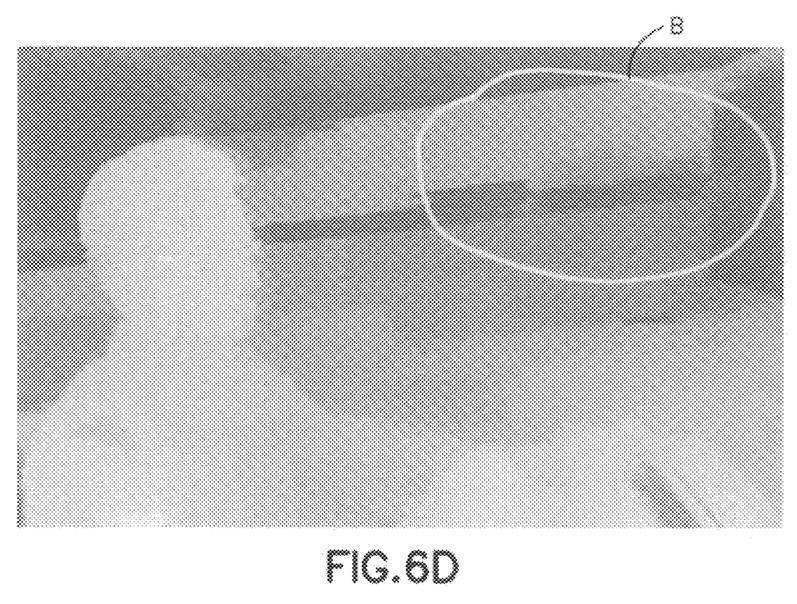

Referring also to FIGS. 2-3, the apparatus 10, in this example embodiment, comprises a housing 12, a touch-screen 14, a receiver 16, a transmitter 18, a controller 20, a rechargeable battery 26 and cameras 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter form a primary communications system to allow the apparatus 10 to communicate with a wireless telephone system, such as a mobile telephone base station for example.

In this example, the apparatus 10 includes the cameras 30 which are located at the rear side 13 of the apparatus, a front camera 32, an LED 34, and a flash system 36. The LED 34 and the flash system 36 are also visible at the rear side of the apparatus, and are provided for the cameras 30. The cameras 30, 32, the LED and the flash system 36 are connected to the controller 20 such that the controller 20 may control their operation. In an alternate example embodiment the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

The apparatus is configured to use the cameras 30 in order to take a 3D or stereo image with use of stereo disparity computation and stereo disparity computation algorithms. Features as described herein may be used to reduce temporal flickering of a disparity map when applied for image sequences in a computationally efficient way; especially in flickering reduction at textureless regions in sequences.

Stereo correspondence computes the disparity of a scene using input left and right stereo images. Conventionally, when the disparity computation is performed over a sequence of left and right images (i.e. video input), the resulting disparity map is not always temporally consistent, and often results in a flickering effect. The flickering issue becomes more severe for the disparity calculation of a scene with smooth or dark surfaces, such as a background wall for example. Features as described herein may be used to remove this artifact in a computationally efficient way.

Features as described herein use a two step novel approach comprising a temporal aggregation using full image support and a confidence based temporal filtering of disparity. These steps result in temporally consistent disparity maps without heavily increasing the complexity compared to prior art.

For the temporal aggregation using full image support, the matching cost of any pixel in the previous K frames may contribute to the current pixel under consideration. This does not consider only a window based 3D cost aggregation, but instead uses a full image support base which is shown to improve accuracy.

Cost aggregation methods are traditionally performed locally by summing/averaging matching cost over windows with constant disparity. However, they are adversely affected by the local nature of traditional window-based cost aggregation algorithms and are vulnerable to the lack of texture. With features as described herein, the cost aggregation problem is addressed with a non-local solution. Similar to edge-aware filters, a guidance image (typically the reference camera image) may be used to compute the pixel similarity for adaptive aggregation. However, the guidance image may be treated as a connected, undirected graph. The vertices may be all the image pixels and the edges may be all the edges between the nearest neighboring pixels. The matching cost values may then be aggregated adaptively based on pixel similarity in a way similar to bilateral filtering, but on a minimum spanning tree (MST) derived from this graph. The similarity between any two vertices may be decided by their shortest distance on the MST.

For a pixel p at location (x, y) in image $I_t$, the temporal aggregated cost is computed by considering the matching cost volume of previous k frames, $C_{t-k}$ along with a current frame's matching cost $C_t$ as shown below:

$$C_t^a(p) = \sum_{q \in I_t} w(p, q) * C_t(q) + \sum_{q_1 \in I_{t-1}} w(p, q_1) * C_{t-1}(q_1) + \ldots \sum_{q_k \in I_{t-k}} w(p, q_k) * C_{t-k}(q_k). \quad (1)$$

where
- w(p,q) is the weight between any two pixels in image $I_t$ and is computed by color weight along the MST path built on image $I_t$. This may be similar to that described in "A non local cost aggregation method for stereo matching" by Q. Yang, CVPR 2012, for example. This can alternatively be achieved by a horizontal and vertical traversal method.
- w(p, $q_k$) is the weight between a pixel p in image $I_t$ and $q_k$ in image $I_{t-k}$. we compute this weight by dividing it to multiple weights along the path as shown below $$w(p,q_k) = w(p,q_0) * w(q_0 * q_1) \ldots w(q_{k-1}, q_k) \quad (2)$$

where $q_i$ is the pixels in image $I_{t-i}$ which are the co-located pixels to the pixel $q_k$ of image $I_{t-k}$ Eventually equation 1 and 2 can be reduced to the form $$C_t^a(p) = \Sigma_{t \in k} w(p,q)(C_t(q) + w(q,q_1) * C_{t-1}(q_1) + \ldots w(q, q_k) * C_{t-k}(q_k)) \quad (3)$$

Equation (3) can be simplified to the form equation (4), which is the aggregated modified cost volume with current frame's MST weights w(p, q) as shown below.

$$C_t^a(p) = \sum_{q \in I_t} w(p, q) * C_m(q) \quad (4)$$

where the modified cost volume $c_m(q)$ is denoted by:

$$C_m(q) = C_t(q) + w(q,q_1) * C_{t-1}(q_1) + \ldots w(q,q_k) * C_{t-k}(q_k)) \quad (5)$$

As can be seen, the temporal cost aggregation equation 4 is a more general form of cost aggregation which takes care of temporal costs when compared to that of the full image support based cost aggregation which only aggregates in spatial domain.

Features as described herein, thus, comprise a novel method to compute temporally consistent disparity at low texture regions. The raw cost volume of a current frame is modified in a way that the current disparity gets an additional support which will influence the next frame's disparity to be consistent. The final temporal cost aggregation is performed using the above modification which results in temporally consistent disparities even when there is textureless regions present.

For the confidence based temporal filtering of disparity, it may take in to account current disparities in addition to a previous frame's disparity. The confidence of the current frame's disparities may be given support by giving a positive bias which will help preserve the disparity consistency in textureless regions.

The spatial filtering of disparity at a pixel p of image $I_t$ is computed using $$D(p) = \sum_{q \in I_t} D(q) * w(p, q)$$

Where w(p,q) is defined the same way as in equation 1 above.

The confidence based spatial filtering is done in a slightly modified way as $$D(p) = \sum_{q \in I_t} D(q) * F(q) * w(p, q)$$

For example F(q) may be the confidence metric computed such as described in "Confidence Evaluation For Robust Fast Converging Disparity Map Refinement" by Jackalsky. et al., IEEE ICME 2010, 3D video lab, Technicolor Res & Innovation, Hannover, Germany. Confidence evaluation may be used which considers the consistency in terms of the uniqueness and visibility constraints along with the match quality. The result is a confidence map that explicitly models the reliability of each disparity estimate. This reliability information may be leveraged in a refinement step that is based on a cross multilateral filter in order to create robust, accurate, and reliable disparity maps.

For the disparity estimation the normalized cross-correlation may be used as similarity measure on intensity images in order to be robust against brightness and color variations. From the overall brightness, it can be derived that the normalized cross-correlation follows approximately an exponential distribution with the maximum at one. For textured regions, the obtained values for the correlation coefficient are typically very close to one showing only little deviations. Even the almost homogeneous regions in the background reach rather high values for many disparity estimates. Consequently, small deviations from the value one should be considered a strong indication for unreliable disparity estimates. Therefore, severely flatten the distribution may be used similar to a kind of histogram equalization. Additionally, a lower limit may be introduced to grant a poor match a minimum confidence as long as it is consistent. A Left-Right Consistency (LRC) check may be employed to assess the reliability of disparity estimates. Based on this analysis, in one example the disparity estimates may be classified into categories, such as: reliable (white and cyan), unreliable (black), occluded (blue), and undecided (red) for example. Undecided is a rejection class for pixels, for which it is not completely clear if they should receive the same amount of penalty as an unreliable one.

The temporal filtering may be computed by:

$$D(p) = \sum_{q \in I_t} D(q) * F(q) * w(p, q) + \sum_{q_1 \in I_{t-1}} D(q_1) * F(q_1) * w(p, q_1) + \ldots \sum_{q_k \in I_{t-k}} D(q_k) * F(q_k) * w(p, q_k) + \ldots$$

An efficient way of implementing the above equation is used in the implementation. The output disparity after this stage has significantly reduced temporal flickering.

Referring also to FIGS. 4A-4D, sequential reference frames of a view finder video from a right camera view are shown, respectively. FIGS. 5A-5D show the original disparity outputs computed from stereo matching for the images shown in FIGS. 4A-4D without use of the filtering solution described above. Inconsistent disparities for a low textured region are shown at areas A and B.

FIGS. 6A-6D show the same frames but with the method described above with disparity outputs computed from stereo matching with the filtering solution to provide the consistent disparities for the low textured regions at areas A and B. Thus, with features as described herein, this solves the specific problem of temporal consistent disparity at all regions using a novel two step approach and excels particularly in textureless regions and dark regions. This is due with a computationally efficient method compared to conventional methods.

Figure 7:
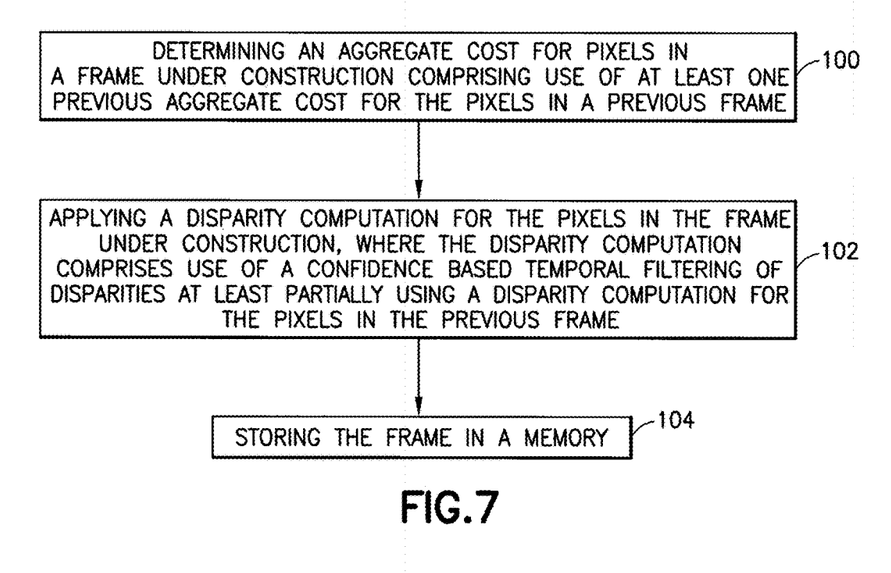
FIG. 7 is a diagram illustrating an example method.

Referring also to FIG. 7, an example method may comprise determining an aggregate cost for pixels in a frame under construction comprising use of at least one previous aggregate cost for the pixels in a previous frame as indicated by block 100; applying a disparity computation for the pixels in the frame under construction, where the disparity computation comprises use of a confidence based temporal filtering of disparities at least partially using a disparity computation for the pixels in the previous frame as indicated by block 102; and storing the frame in a memory as indicated by block 104. The memory storage may be temporary such as just before displaying the image on a view finder for example.

The aggregate cost may be determined with use of edge-aware filtering and a minimum spanning tree (MST). The edge-aware filtering may comprise bilateral filtering. A matching cost of the pixels in a plurality of the previous frame may contribute to forming the pixels in the frame under consideration. Determining the aggregate cost for pixels in the frame under construction might not comprise use of a window-based cost aggregation. A raw cost volume of a current frame being used to create the frame under construction may be modified in a way that the disparity for the frame under constructions gets an additional support which will influence disparity of a subsequent frame. The confidence based temporal filtering of disparities may comprise use of a confidence of disparities in the frame under construction being given a positive bias to help preserve disparity consistency in textureless regions of the frame. Determining the aggregate cost for pixels in the frame under construction may comprise use of the previous aggregate cost for all or substantially all of the pixels in the previous frame.

An example apparatus may comprise at least one processor; and at least one non-transitory memory including computer program code, the at least one memory and the computer program code configured to, with the at least one processor, cause the apparatus to: determine an aggregate cost for pixels in a frame under construction comprising use of at least one previous aggregate cost for the pixels in a previous frame, where the aggregate cost is determined with use of edge-aware filtering and a minimum spanning tree (MST); apply a disparity computation for the pixels in the frame under construction, where the disparity computation comprises use of a confidence based temporal filtering of disparities at least partially using a disparity computation for the pixels in the previous frame; and store the frame in a memory.

The edge-aware filtering comprises bilateral filtering. The at least one memory and the computer program code may be configured to, with the at least one processor, cause the apparatus to have a matching cost of the pixels in a plurality of the previous frame contribute to forming the pixels in the frame under consideration. The at least one memory and the computer program code may be configured to, with the at least one processor, cause the apparatus to have the aggregate cost for the pixels in the frame under construction not comprise use of a window-based cost aggregation. The at least one memory and the computer program code may be configured to, with the at least one processor, cause the apparatus to have a raw cost volume of a current frame be used to create the frame under construction is modified in a way that the disparity for the frame under constructions gets an additional support which will influence disparity of a subsequent frame. The at least one memory and the computer program code may be configured to, with the at least one processor, cause the apparatus to have the confidence based temporal filtering of disparities use a confidence of disparities in the frame under construction being given a positive bias to help preserve disparity consistency in textureless regions of the frame.

An example non-transitory program storage device may be provided, such as by memory 24 for example, readable by a machine, tangibly embodying a program of instructions executable by the machine for performing operations, the operations comprising: determining an aggregate cost for pixels in a frame under construction comprising use of at least one previous aggregate cost for the pixels in a previous frame, where the aggregate cost is determined with use of edge-aware filtering and a minimum spanning tree (MST); applying a disparity computation for the pixels in the frame under construction, where the disparity computation comprises use of a confidence based temporal filtering of disparities at least partially using a disparity computation for the pixels in the previous frame; and storing the frame in a memory.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example apparatus may comprise means for determining an aggregate cost for pixels in a frame under construction comprising use of at least one previous aggregate cost for the pixels in a previous frame, where the aggregate cost is determined with use of edge-aware filtering and a minimum spanning tree (MST); means for applying a disparity computation for the pixels in the frame under construction, where the disparity computation comprises use of a confidence based temporal filtering of disparities at least partially using a disparity computation for the pixels in the previous frame; and means for storing the frame in a memory. The means may comprise use of the methods, components and software as described above.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   determining an aggregate cost for pixels in a frame under construction comprising use of at least one previous aggregate cost for the pixels in a previous frame; and
   applying a disparity computation for the pixels in the frame under construction for creating the frame, where the disparity computation comprises use of a confidence based temporal filtering of disparities at least partially using a disparity computation for the pixels in the previous frame.

2. A method as in claim 1 where the aggregate cost is determined with use of edge-aware filtering and a minimum spanning tree (MST).

3. A method as in claim 2 where the edge-aware filtering comprises bilateral filtering.

4. A method as in claim 1 where a matching cost of the pixels in a plurality of the previous frame contribute to forming the pixels in the frame under consideration.

5. A method as in claim 1 where determining the aggregate cost for pixels in the frame under construction does not comprise use of a window-based cost aggregation.

6. A method as in claim 1 where a raw cost volume of a current frame being used to create the frame under construction is modified in a way that the disparity for the frame under constructions gets an additional support which will influence disparity of a subsequent frame.

7. A method as in claim 1 where the confidence based temporal filtering of disparities comprises use of a confidence of disparities in the frame under construction being given a positive bias to help preserve disparity consistency in textureless regions of the frame.

8. A method as in claim 1 further comprising storing the frame in a memory.

9. A method as in claim 1, where determining the aggregate cost for pixels in the frame under construction comprises:
   using the previous aggregate cost for all or substantially all of the pixels in the previous frame to determine the aggregate cost for pixels in the frame under construction.

10. An apparatus comprising:
    at least one processor; and
    at least one non-transitory memory including computer program code, the at least one memory and the computer program code configured to, with the at least one processor, cause the apparatus to:
    determine an aggregate cost for pixels in a frame under construction comprising use of at least one previous aggregate cost for the pixels in a previous frame; and
    apply a disparity computation for the pixels in the frame under construction for creating the frame, where the disparity computation comprises use of a confidence based temporal filtering of disparities at least partially using a disparity computation for the pixels in the previous frame.

11. An apparatus as in claim 10, where, when determining the aggregate cost for pixels in the frame under construction, the at least one memory and the computer program code are configured to, with the at least one processor, cause the apparatus to:
    use edge-aware filtering and a minimum spanning tree (MST).

12. An apparatus as in claim 11 where the edge-aware filtering comprises bilateral filtering.

13. An apparatus as in claim 10 where the at least one memory and the computer program code are configured to, with the at least one processor, cause the apparatus to have a matching cost of the pixels in a plurality of the previous frame contribute to forming the pixels in the frame under consideration.

14. An apparatus as in claim 10 where the at least one memory and the computer program code are configured to, with the at least one processor, cause the apparatus to have the aggregate cost for the pixels in the frame under construction not comprise use of a window-based cost aggregation.

15. An apparatus as in claim 10 where the at least one memory and the computer program code are configured to, with the at least one processor, cause the apparatus to have a raw cost volume of a current frame be used to create the frame under construction is modified in a way that the disparity for the frame under constructions gets an additional support which will influence disparity of a subsequent frame.

16. An apparatus as in claim 10 where the at least one memory and the computer program code are configured to, with the at least one processor, cause the apparatus to have the confidence based temporal filtering of disparities use a confidence of disparities in the frame under construction being given a positive bias to help preserve disparity consistency in textureless regions of the frame.

17. An apparatus as in claim 10 where the at least one memory and the computer program code are configured to, with the at least one processor, cause the apparatus to store the frame in a memory.

18. An apparatus as in claim 10 where determining the aggregate cost for pixels in the frame under construction comprising use of the previous aggregate cost for all or substantially all of the pixels in the previous frame.

19. A non-transitory program storage device readable by a machine, tangibly embodying a program of instructions executable by the machine for performing operations, the operations comprising:
  determining an aggregate cost for pixels in a frame under construction comprising use of at least one previous aggregate cost for the pixels in a previous frame; and
  applying a disparity computation for the pixels in the frame under construction for creating the frame, where the disparity computation comprises use of a confidence based temporal filtering of disparities at least partially using a disparity computation for the pixels in the previous frame.

20. A non-transitory program storage device as in claim 19 where the aggregate cost is determined with use of edge-aware filtering and a minimum spanning tree (MST).

21. A non-transitory program storage device as in claim 20 where the edge-aware filtering comprises bilateral filtering.

22. A non-transitory program storage device as in claim 19 where a matching cost of the pixels in a plurality of the previous frame contribute to forming the pixels in the frame under consideration.

23. A non-transitory program storage device as in claim 19 where determining the aggregate cost for pixels in the frame under construction does not comprise use of a window-based cost aggregation.

24. A non-transitory program storage device as in claim 19 where a raw cost volume of a current frame being used to create the frame under construction is modified in a way that the disparity for the frame under constructions gets an additional support which will influence disparity of a subsequent frame.

25. A non-transitory program storage device as in claim 19 where the confidence based temporal filtering of disparities comprises use of a confidence of disparities in the frame under construction being given a positive bias to help preserve disparity consistency in textureless regions of the frame.

26. An apparatus comprising:
  means for determining an aggregate cost for pixels in a frame under construction comprising use of at least one previous aggregate cost for the pixels in a previous frame; and
  means for applying a disparity computation for the pixels in the frame under construction for creating the frame, where the disparity computation comprises use of a confidence based temporal filtering of disparities at least partially using a disparity computation for the pixels in the previous frame.

* * * * *